United States Patent [19]

Comfort et al.

[11] 4,374,413
[45] * Feb. 15, 1983

[54] ARBITRATION CONTROLLER PROVIDING FOR ACCESS OF A COMMON RESOURCE BY A PLURALITY OF CENTRAL PROCESSING UNITS

[75] Inventors: Joseph A. Comfort; Thomas J. Perry; Michel Loos, all of Phoenix, Ariz.

[73] Assignee: GTE Automatic Electric Labs Inc., Northlake, Ill.

[*] Notice: The portion of the term of this patent subsequent to Feb. 15, 2000, has been disclaimed.

[21] Appl. No.: 163,045

[22] Filed: Jun. 26, 1980

[51] Int. Cl.³ .................... G06F 13/00; G06F 15/16
[52] U.S. Cl. .................................................. 364/200
[58] Field of Search ... 364/200 MS File, 900 MS File, 364/187, 200; 371/9

[56] References Cited

U.S. PATENT DOCUMENTS

| | | | |
|---|---|---|---|
| 3,505,651 | 4/1970 | Barlow et al. | 364/200 |
| 3,521,238 | 7/1970 | Gunderson | 364/200 |
| 3,699,529 | 10/1972 | Beyers et al. | 364/200 |
| 3,806,885 | 4/1974 | Moore | 364/200 |
| 3,882,455 | 5/1975 | Heck et al. | 371/9 |
| 4,034,347 | 7/1977 | Probert, Jr. | 364/200 |
| 4,065,809 | 12/1977 | Matsumoto | 364/200 |
| 4,096,571 | 6/1978 | Vander mey | 364/200 |
| 4,159,518 | 6/1979 | Draper et al. | 364/200 |
| 4,164,787 | 8/1979 | Aranguren | 364/200 |
| 4,171,536 | 10/1979 | Hever et al. | 364/200 |
| 4,228,496 | 10/1980 | Katzman et al. | 364/200 |

*Primary Examiner*—Mark E. Nusbaum
*Assistant Examiner*—William G. Niessen
*Attorney, Agent, or Firm*—Robert J. Black; Frank J. Bogacz

[57] ABSTRACT

An arbitration controller providing for equal priority sharing of a resource by a plurality of central processing units. Conflicts resulting from simultaneous requests from several CPU's for access to the common resource are resolved at a high rate of speed. In addition, an approximately statistically equal probability is maintained for access of the common resource by all the central processing units.

9 Claims, 4 Drawing Figures

ARBITRATION CONTROLLER PROVIDING FOR ACCESS OF A COMMON RESOURCE BY A PLURALITY OF CENTRAL PROCESSING UNITS

CROSS-REFERENCE TO RELATED APPLICATIONS

The present application is related to copending U.S. applications Ser. Nos.: 163,044; 163,046; 163,047; 163,048; and 163,049, all assigned to the same assignee.

BACKGROUND OF THE INVENTION (1) Field of the Invention

The present invention pertains to multicentral processing unit controlled real time systems and more particularly to an arbitration scheme for resolving conflicting requests from the central processing units for access to a commonly shared resource.

(2) Description of the Prior Art

Computer control has been applied to a vast number of real time process control systems. For example, central processing units (CPUs) control the real time switching operation in modern telephone central offices. Historically, large CPUs have been developed to provide the control function for large telephone central offices.

In more recent times, large central processing units have given way to distributed processing schemes. In such schemes, numbers of smaller central processing units act together to perform the control functions, thereby increasing the overall flexibility of such a system and providing for modular expansion. In the telephone central office example, many smaller central processor units working together can handle telephone traffic more efficiently and economically than a single large central processing unit. Microprocessor CPUs are specially suited to such an operation.

In distributed processing systems where there are a number of central processing units, CPUs may typically exchange information in order to perform one overall task. One solution to the information exchange problem is to have two CPUs talk directly to one another. In such a configuration, each CPU must stop any other tasks which it may be performing establish a direct link via a defined protocol scheme and then transmit the required information.

In another solution, the CPUs may asynchronously place information in a predefined resource, so that the CPU which is to receive the information may remove it at its own particular available time. In sharing a common resource, a problem of allocation of the resource to a particular CPU arises. That is, a number of CPUs may request to deposit or retrieve information simultaneously. Therefore, conflicts in accessing the resource arise and these conflicts of access must be resolved. Previous access schemes involved scanning signals for request or allocating certain time slots in which each processor may access the resource. Such systems are time consuming and inefficient and further they allow monopolization of the resource by a particular CPU of the group.

Accordingly, it is an object of the present invention to provide an arbitration controller for providing equal priority sharing of a common resource by a plurality of CPUs.

It is a further important objective of the present invention to provide such a controller which prohibits monopolization of the common resource by a particular CPU.

It is another important objective of the present invention to provide for the arbitration of simultaneous access by CPUs at a very rapid rate in order to allow an efficient information exchange.

It is another important objective of the present invention to provide for an approximately statistically equal probability of each CPU for obtaining access to the resource.

It is another important objective of the present invention to provide an arbitration controller which may grow in the number of CPUs which are subject to control, in an efficient and economical manner.

SUMMARY OF THE INVENTION

The present invention comprises an arbitration controller providing for equal priority sharing of a common resource by a plurality of CPUs. These CPUs communicate with one another by transmitting information asynchronously to the common resource and retrieving information deposited therein by the other CPUs. One resource can operate with only one CPU at one time. Therefore, each CPU is connected to a corresponding arbitration circuit and the connections between each CPU and its corresponding arbitration circuit each comprise a tri-state bus arrangement. Each arbitration circuit is connected to the resource via a common tri-state bus. Due to the large number of CPUs employed and physical limitations, the CPUs and corresponding arbitration circuits are grouped into two subgroups.

In each subgroup, each arbitration circuit is connected to the next successive arbitration circuit, with the last arbitration circuit being connected to the first, thereby forming a ring connection for each of the two subgroups of arbitration circuits. An initialization signal is applied to the first arbitration circuit of each subgroup and a bus available signal is derived from it and is progagated along each ring connection in a circular fashion. When a CPU requests an access to the common resource, a signal is transmitted via the tri-state bus between the CPU and the arbitration circuit. Since the bus available signal moves along the completed ring connection at a high rate of speed, in a very short time the bus available signal will enter the logic of the arbitration circuit corresponding to the CPU which has made the common resource request. The signals are analyzed by the arbitration circuit and transmitted to a subgroup switching circuit. Since one CPU has requested resource access, the switching circuit will automatically enable the requesting CPU to access the common tri-state bus connected to the resource. The CPU then proceeds with the information exchange and other CPUs must wait.

When two or more CPUs of one subgroup simultaneously request access to the common resource, the next CPU which has an active common resource request and sequentially obtains the bus available signal will gain control of the common resource. The bus available signal travels at a high rate of speed slowed only by a single gate propagation time, if no requests for the common resource are active. The probability of any CPU gaining access to the common resource is statistically equal to that of any other CPU. Each CPU is allowed only one access cycle to the common resource and then must relinquish control of the resource. In this way, one CPU is prohibited from monopolizing the resource for a long period of time.

When two CPUs located in the different subgroups simultaneously request access to the common resource, the arbitration of this conflicts is resolved by a switching circuit. The essence of this switching circuit is to operate when CPUs in two subgroups simultaneously request access to the resource, to choose one or the other. The switching circuit alternates its selection at a high rate of speed so the choice is nearly random. If only one CPU requests, the switching circuit need not choose and simply allocates the resource. When the circuit must choose, the periodic pulses of an input clock signal provide the selection of which subgroup has first access. Access is then alternately allocated.

After the completion of one access cycle to the common resource, the other CPUs of each subgroup will sequentially be granted the access to the resource. If other CPUs have active requests, they will be serviced in a sequential fashion similar to that as described above.

While one CPU of one subgroup is accessing the resource, and if no other CPUs of that subgroup have active common bus request signals, the bus available signal will propagate along the ring connection of each group and back to the CPU which is currently accessing the resource. The propagation of the bus available signal will not be halted, because other common bus request signals in each subgroup may have become active in the intervening propagation time. Therefore, the each arbitration circuit will re-propagate the bus available signal, so that the next active common bus request of each subgroup can be established simultaneously with the processing of the current resource access. In addition, this scheme of re-propagating the bus available signal prevents a particular CPU from making two consecutive resource accesses.

In each subgroup if the bus available signal returns to the arbitration circuit making a resource access, a take grant signal is generated to automatically allow the next sequential arbitration circuit of each subgroup to access the resource if it has an active request. This take grant signal is important when no other CPUs have an active request because it prevents one arbitration circuit from multiple consecutive accesses and distributes determination of which is the next available resource request in the subgroup to the given access on a rotational basis. This scheme keeps resource access equal when CPU requests are few and sporadic.

Optionally, each arbitration circuit of each subgroup provides its associated CPU with the ability to hold the access of the resource for more than one cycle.

DESCRIPTION OF THE DRAWINGS

FIGS. 1A and 1B are to be placed side by side with FIG. 1A on the left and FIG. 1B on the right.

DESCRIPTION OF THE PREFERRED EMBODIMENT

Figure 1A:
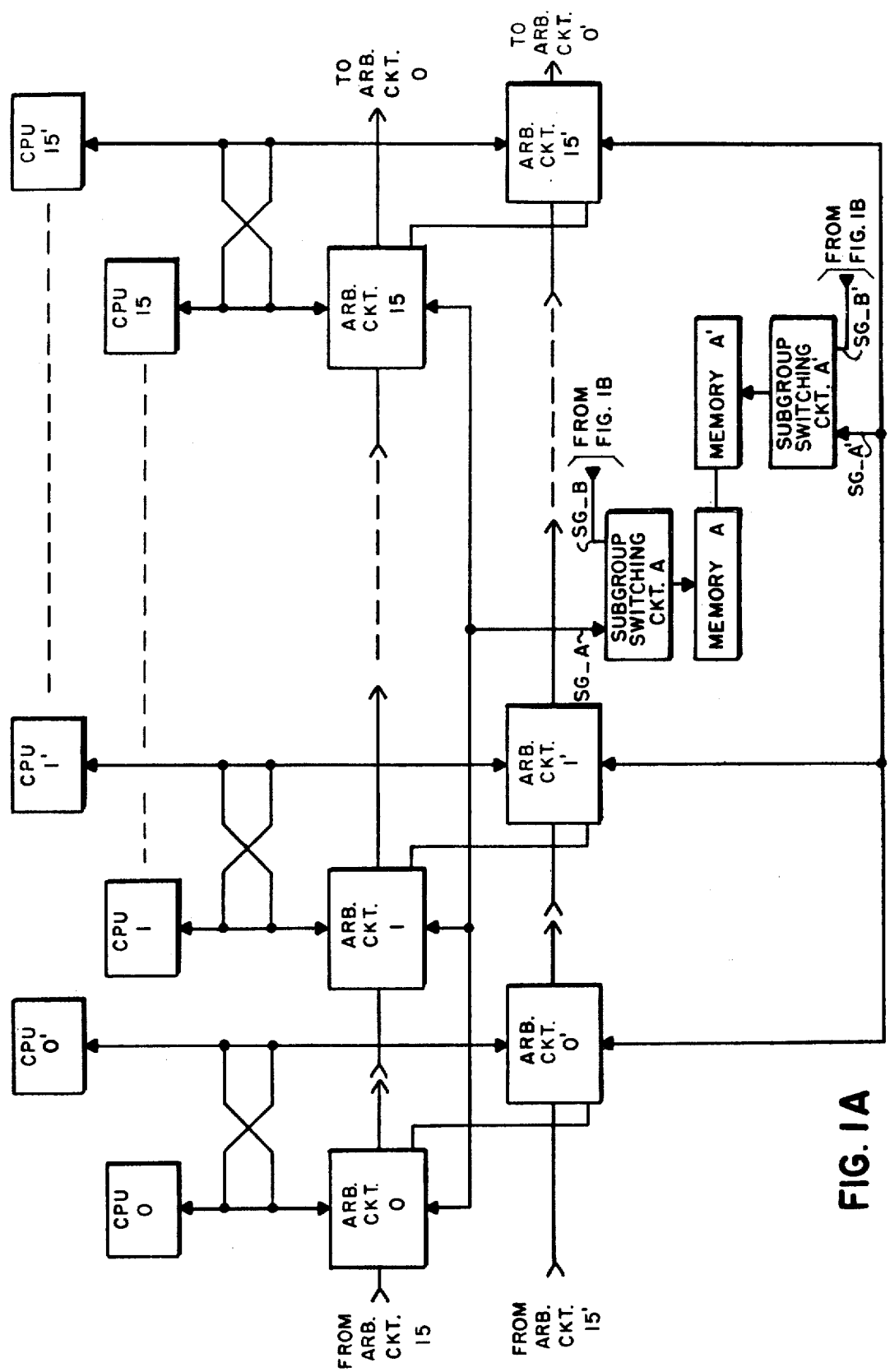
FIGS. 1A and 1B comprise a block diagram of an arbitration controller providing equal priority sharing of a common resource by a plurality of CPUs.
Figure 1B:
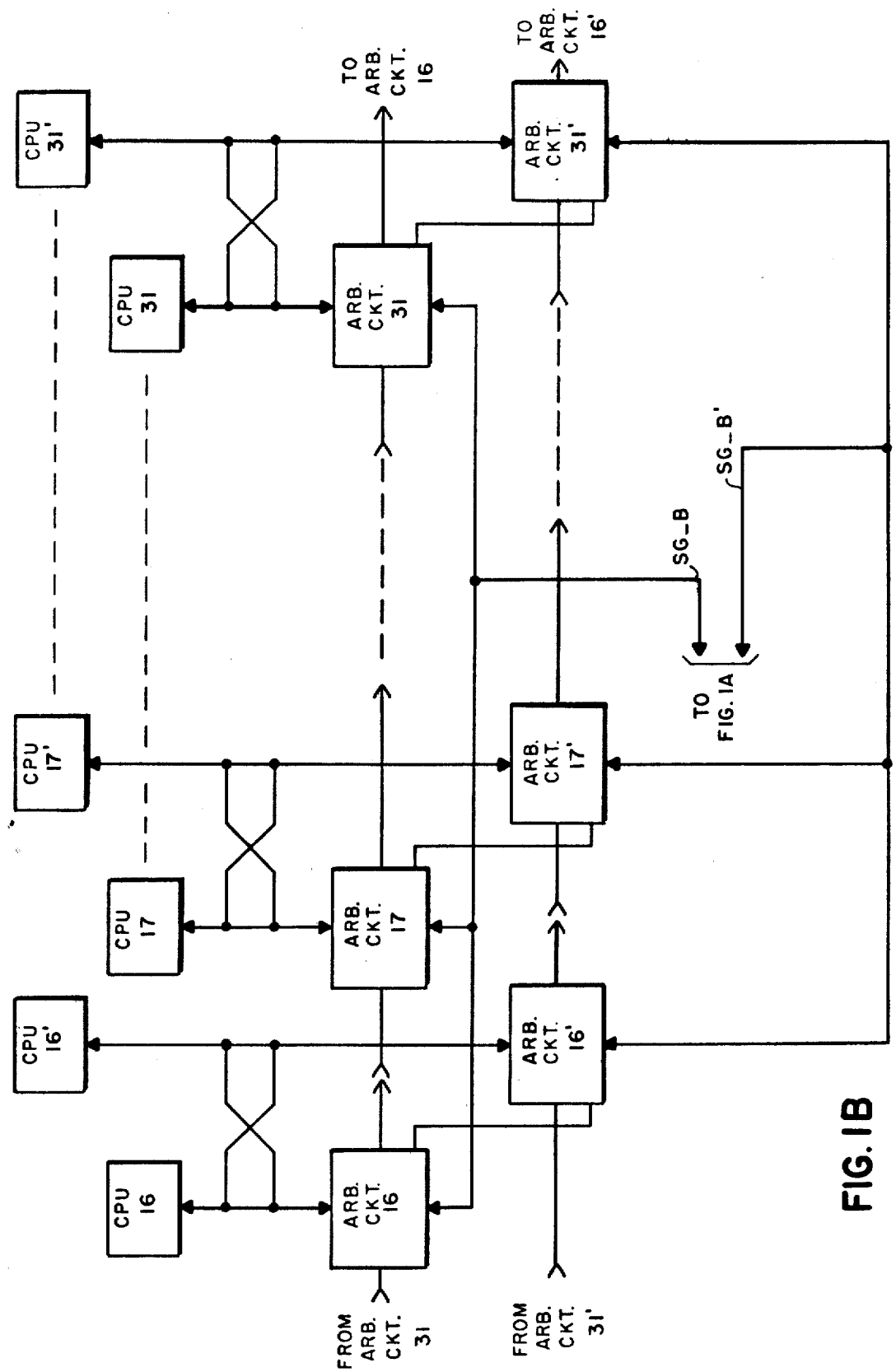

Referring to FIGS. 1A and 1B, an arbitration controller apparatus is shown, such apparatus being shown in a duplex form. The present application teaches simplex arbitration control only as shown by all the unprimed block symbols. Duplex arbitration control is taught in co-pending sister application Ser. No. 163,046. Therefore, this application will deal only with the unprimed block symbol shown in FIGS. 1A and 1B.

Each central processing unit (CPU) 0–15 and 16–31 is shown connected via a tri-state bus to a corresponding arbitration circuit 0–15 and 16–31. Due to physical constraints, CPUs 0–15 comprise one subgroup and CPUs 16–31 comprise another subgroup. Each arbitration circuit 0–15 and 16–31 is in turn connected via a common tri-state bus to memory unit A via subgroup switching circuit A. Abritration circuit 0 is connected to arbitration circuit 1 with arbitration circuit 1 being connected to the next successive arbitration circuit of the subgroup and the last arbitration circuit 15 connected back again to arbitration circuit 0, thereby forming a completed ring connection. Similarly, arbitration circuit 16 is connected to arbitration circuit 17 with arbitration circuit 17 being connected to the last arbitration circuit of the subgroup 31 and the last arbitration circuit 31 is connected back again to arbitration circuit 16. The number of arbitration circuits is in direct relation to the number of CPUs in the configuration.

The configuration may contain as many as 32 central processing units (each may comprise an INTEL 8086 or similar device) and therefore, 32 arbitration circuits. The number of CPUs is expandable from 2 to a total of 32 in this implementation. As a practical matter, at least two CPUs one from each subgroup are required for the function of telephone central office switching.

When an initialization signal is applied to arbitration circuits 0 and 16, two parallel bus available signals are derived and propagated along to each successive arbitration circuit of the subgroup ultimately returning to arbitration circuits 0 and 16 respectively where they are again propagated. When for example, CPU 0 requests access to memory A, arbitration circuit 0 receives a request signal via its bus. And as the bus available signal is propagating through the logic of arbitration circuit 0, arbitration circuit 0 will temporarily block the propagation of the bus available signal. Since only CPU 0 is active, CPU 0 will have its request transmitted through subgroup switching circuit A and will obtain control of the common bus between the arbitration circuits and can access memory A. CPU 0 then performs a memory access of a duration of one memory cycle while simultaneously re-propagating the bus available signal to the next sequential arbitration circuit 1. The operation is analogous for CPU 16 accessing memory A via arbitration circuit 16 and subgroup switching circuit A.

The bus available signal travels along each the ring connection of arbitration circuits 0–15 and 16–31 at a relatively high rate of speed, so that the probability of each CPU gaining access to memory A is relatively equal among the CPUs. Each arbitration circuit slows the propagation of the bus available signal only by the time required to propagate this signal through a high speed gating arrangement.

When two or more CPUs of one subgroup simultaneously request access to memory A, a conflict situation arises. This conflict is arbitrated by means of the ring connection of arbitration circuits. The bus available signal propagates to the next sequential arbitration circuit of the subgroup. If that arbitration circuit has an active request for access to the common bus of memory A, the CPU associated with this arbitration circuit is then given control of the bus enabling the memory transfer to occur.

During this time, the bus available signal is re-propagated to the next succeeding arbitration circuit of the subgroup so that the second CPU may simultaneously establish itself as the next CPU to obtain the resource via the common bus. This arbitration occurs sequentially as described above until all outstanding requests for access to memory A have been serviced.

When a particular CPU has been granted access to memory A, the bus available signal will be re-propagated by its corresponding arbitration circuit. Other active CPUs will have the opportunity to establish a priority for service before a memory request will be granted to the same CPU. If the bus available signal returns to the arbitration circuit presently in control of the memory, a grant signal will automatically pass control of the grant of access to the next sequential arbitration circuit. Thereby, a particular CPU does not utilize its arbitration circuit to monopolize access to memory A.

When two CPUs located in different subgroups, for example CPU 0 and CPU 16, simultaneously request access to the memory A, arbitration of this conflict is resolved by subgroup switching circuit A. Switching circuit A operates to select CPU 0 or 16 randomly and then alternates access to memory A from one subgroup to the other subgroup, for example first CPU 0, next CPU 16, next CPU 1, next CPU 17, etc. If only one CPU is requesting, switching circuit A simply allocates memory A to that CPU. When switching circuit A must choose between CPUs of different subgroups, the initial choice is established by a periodic pulse input signal selecting one group. Access is then alternately allocated between groups.

However, optically a CPU may lockout all other CPUs for more than one memory cycle. Such conditions are limited and closely monitored.

Figure 2:
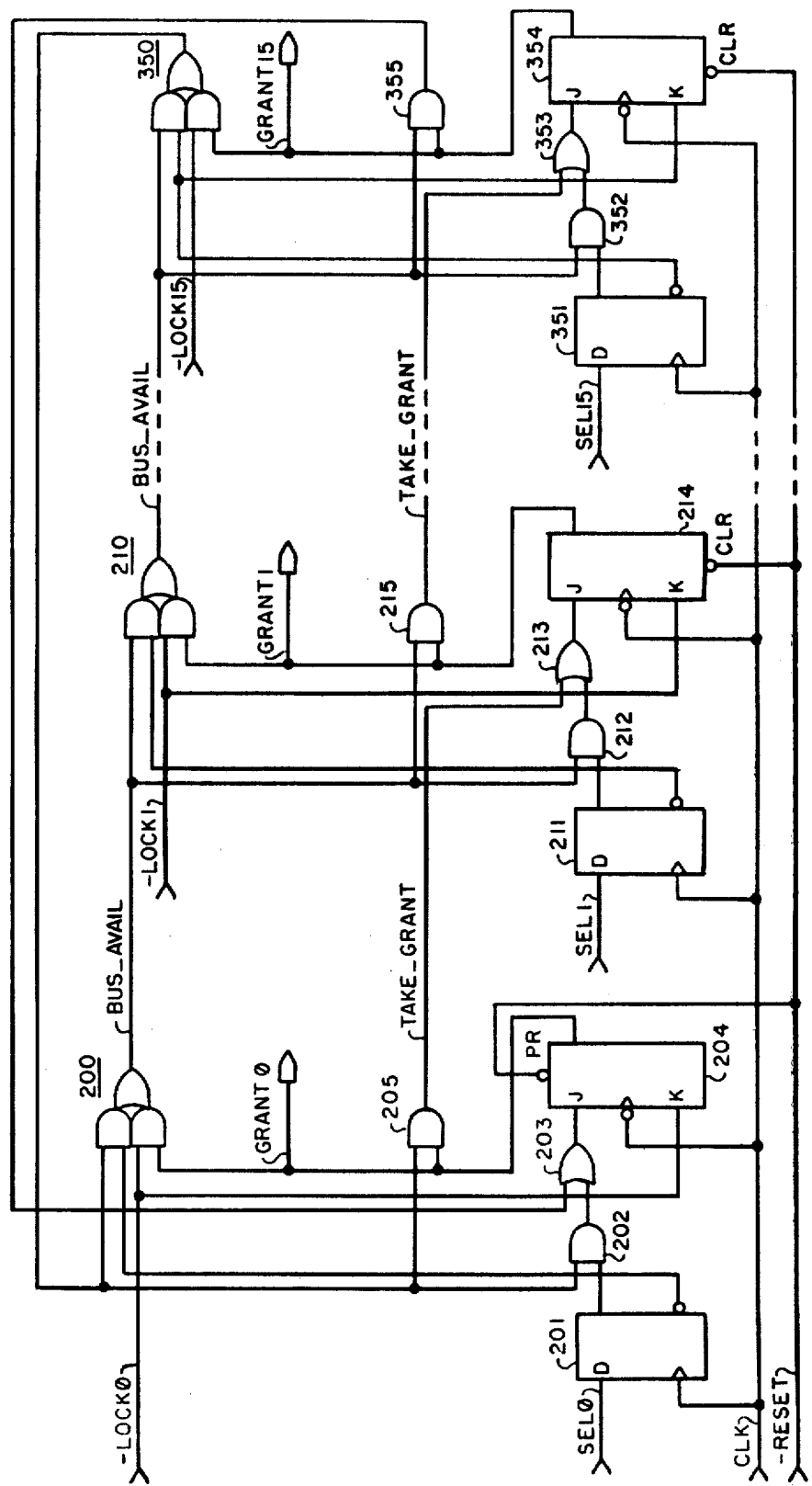
FIG. 2 is a schematic diagram of an arbitration circuit embodying the principles of operation of the present invention.

Referring now to FIG. 2, a schematic diagram of three arbitration circuits of one subgroup is shown. These circuits correspond to a first, a second and a last arbitration circuits. A particular implementation may include up to 16 arbitration circuits per subgroup, one for each CPU equipped in the configuration. Thereby, a maximum configuration of 32 CPUs and 32 arbitration circuits is possible.

Each arbitration circuit includes a gating arrangement composed of an AND-OR gate 200, which may be implemented via an integrated circuit part number 74S51 or similar device. A ring connection of gates 200, 210, etc. propagates the bus-avail signal from one arbitration circuit to the next at a relatively high rate of speed so that the signal is not inhibited by any single arbitration circuit for a substantial period of time.

D-Type flip-flop 201, 211 and 351 are each connected between a respective CPU and its respective arbitration logic. Gates 201, etc. may be implemented via integrated circuit part number 74S74. JK flip-flop 204, 214, etc. are each connected between their corresponding D-type flip-flops 201, 211, etc. and their corresponding AND-OR gate 200, 210, etc.

As a portion of the system clear and initialization, CPU 0 or CPU 16 pulses the reset lead which is connected to JK flip-flops 204, 214, etc. As a result the bus-avail signal is generated through AND-OR gate 200 and propagates along the ring connection to AND-OR gate 210, 350 and back again to gate 200. A 12 MHZ clock signal, from a clock (not shown), is transmitted to all flip-flops (D-type and JK) via the CLK lead to operate each of these flip-flops.

An example will best serve to illustrate the granting of control of the common bus to a particular CPU. When, for example, CPU 0 signals via the reset lead, flip-flop 204 is preset enabling gate 200 to transmit the bus available signal via the bus-avail lead to each successive gate 210, etc. When CPU 0 requests access to the common memory, CPU 0 raises the SEL0 lead via the bus connected between CPU 0 and arbitration circuit 0. At the next clock cycle, the clock signal via the CLK lead is transmitted to flip-flop 201 which becomes set and the Q output of this flip-flop temporarily disables gate 200 from further passing the bus-avail signal. The Q output of flip-flop 201 is passed through gates 202 and 203 and sets flip-flop 204, which causes it to toggle and produce a signal on the grant 0 lead and simultaneously enables gate 205. The grant 0 lead is returned to CPUs 0 and 0, and this signal also enables tri-state elements (not shown), gating CPU 0 bus onto the common bus of memory A. While this memory access takes place, the bus available signal is re-propagated via the output of JK flip-flop 204 through the lower portion of gate 200, so that the successive arbitration circuits may establish their respective priority for the memory access.

If the bus available signal returns to arbitration circuit 0 via the bus-avail lead while the access is in progress, the grant signal is transmitted via the take-grant lead automatically to the next sequential arbitration circuit 1, so that if SEL1 is set, CPU 1 access requests will be given the grant on the next clock cycle. This scheme distributes determination of which is the next available memory request to be given access on a rotational basis; and this scheme further keeps memory access equal when CPU access requests are sporadic. In this way, a CPU may not make successive memory requests.

CPU 0 may now completes its data transfer to memory A. If another arbitration circuit has established its priority, that arbitration circuit will receive control of the common bus next. In this way, while one CPU is accessing memory, the next CPU is establishing its priority for service.

All buses are bidirectional and each directional link includes tri-state bus drivers which may be implemented via integrated circuit part number 74LS245. All above mentioned integrated circuits are manufactured by Texas Instruments Incorporated and various other manufacturers.

The CPU having the memory access grant may signal via the lock lead (normally high) to halt the re-propagation of the bus available signal and thereby hold memory access for longer than one cycle. This optional use is a rare circumstance and is closely monitored by the CPUs.

Figure 3:
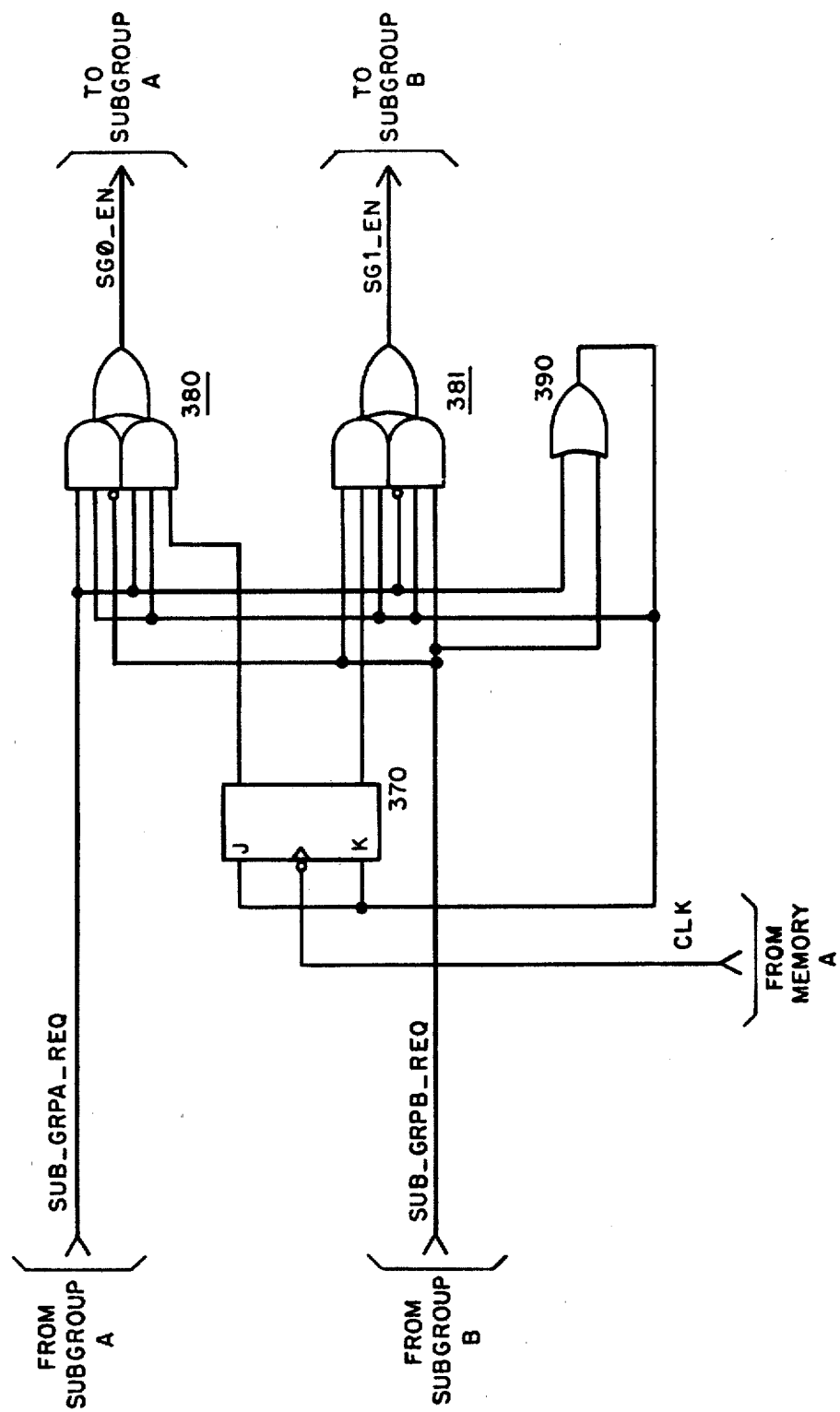
FIG. 3 is a schematic diagram of a subgroup switching circuit.

Referring to FIG. 3, a schematic diagram of subgroup switching circuit A of FIG. 1A is shown. J-K flip-fop 370 is connected via the CLK lead to clock (not shown) providing an 12 MHZ cycle clock signal, flip-flop 370 is further connected to each of AND-OR gates 380 and 381 and OR gate 390. If, for example, a CPU of subgroup A is the only one requesting, the upper and gate of gate 380 is enabled and the CPU of subgroup A has its tri-state bus (not shown) enabled to access memory A.

When two CPUs, one from each subgroup, simultaneously request access to the memory, the upper portion of gate 380 and lower portion of gate 381 are disabled. On the next clock cycle via the CLK lead, flip-flop 370 will toggle to enable the lower portion of gate 380 or the upper portion of gate 381, thereby selecting subgroup A or B respectively. Only one subgroup is enabled to access memory and on the next clock cycle the remaining subgroup is enabled.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An arbitration controller providing for equal priority sharing of a common resource by a plurality of CPUs, said arbitration controller comprising:

a common bus including first and second portions;
   switching means operated to provide alternate first and second selection signals;
   first and second arbitration groups, each of said groups including:
   means for initialization providing a first signal;
   a plurality of arbitration circuits including a first, at least one successive and a last arbitration circuit;
   said means for initialization connected to at least one of said arbitration circuits;
   a plurality of CPU buses, each connected between a particular CPU and said resource via a particular arbitration circuit on a one for one basis, each CPU bus including a control portion and an address/data portion;
   said common bus connected between each of said CPUs and said resource via said particular arbitration circuit for the transmission of information between said resource and any of said plurality of CPUs via said address/data portion of said CPU bus;
   bus means for connecting each said common bus to each of said plurality of CPU buses in a tri-state fashion;
   a plurality of circuit connections including a circuit connection between each arbitration circuit and each successive arbitration circuit, said last arbitration circuit connected to said first arbitration circuit, thereby forming a completed ring connection for propagating said first signal from one arbitration circuit to another arbitration circuit in a circular fashion;
   each arbitration circuit operated in response to said first signal and to a common bus request signal from its corresponding CPU to produce a second signal for allowing said corresponding one of said plurality of CPUs access to said resource via said common bus;
   each said arbitration circuit including:
   first gating means operated to propagate said first signal along said ring connection at a relatively high rate of speed;
   latching means operated in response to said common bus request signal of said corresponding CPU to produce said second signal for allowing said CPU to access said resource via said common and CPU buses;
   second gating means operated in response to said operated latching means and in response to said propagated first signal to propagate a third signal from each arbitration circuit to each successive arbitration circuit;
   said first signal propagating through each of said arbitration circuits in said ring connection to successively enable said CPU access to said resource via said common bus, while said third signal permitting said successive arbitration circuits to establish priority for subsequent access of said resource simultaneously with a present access of said resource; and
   said switching means connected between said first and said second portions of said common bus and said resource whereby said first selection signal operates to enable access to said resource from said CPUs of said first portion of said common bus via said corresponding arbitration circuits and said first selection signal operates to inhibit said access from said CPUs of said second portion to said common bus and alternately said second selection signal operates to enable said access from said CPUs of said second portion of said common bus via said corresponding arbitration circuits and said second selection signal operates to inhibit access from said CPUs of said first portion to said common bus.

2. An arbitration controller as claimed in claim 1, wherein: each of said arbitration circuits has its first and second gating means interconnected whereby each CPU is given an equal priority access to said resource by inhibiting said propagation of said first signal.

3. An arbitration controller as claimed in claim 2, wherein: said first gating means is further connected to said corresponding CPU whereby said corresponding CPU exclusively controls access to said common resource.

4. An arbitration controller as claimed in claim 1, wherein: said latching means includes first and second flip-flops, said first flip-flop connected between said corresponding CPU and said second flip-flop, said second flip-flop connected to said first and said second gating means of said arbitration circuit, whereby said common bus request signal of said corresponding CPU is stored for arbitration.

5. An arbitration controller as claimed in claim 4, wherein: each of said flip-flops of each arbitration circuit includes a clock connection adapted to drive each of said flip-flops.

6. An arbitration controller as claimed in claim 1, wherein: said switching means includes:
   a flip-flop;
   gating means connected between said flip-flop and said first and second portions of said common bus, operated in response to said flip-flop and to simultaneous common bus request signals from said first and said second common bus portions to inhibit access of said resource by said first arbitration group and alternately operated to inhibit access of said resource by said second arbitration group.

7. An arbitration controller as claimed in claim 6, wherein: said flip-flop further includes a clock connection to an external clock whereby said flip-flop is operated in response to said clock at a relatively high rate of speed to allow an equal priority access to said resource from CPUs of said first arbitration group and alternately from CPUs of said second arbitration group.

8. An arbitration controller as claimed in claim 6, wherein: said gating means includes first and second gates, each connected to said flip-flop and to said first and second common bus portion of said common bus; said first gate operated to enable access to said resource by said first arbitration group and said second gate simultaneously operated to inhibit said access to said resource by said second arbitration group, and alternately said first gate operated to inhibit said access to said resource by said first arbitration group and said second gate simultaneously operated to enable said access to said resource by said second arbitration group.

9. An arbitration controller as claimed in claim 6, wherein: said gating means further includes a third gate connected to said first and second bus portions, to said flip-flop and to said first and second gates.

* * * * *